United States Patent [19]

Ruta

[11] Patent Number: 4,567,540

[45] Date of Patent: Jan. 28, 1986

[54] POWER SUPPLY FOR A CIRCUIT INTERRUPTER

[75] Inventor: Joseph W. Ruta, Elmhurst, Ill.

[73] Assignee: S&C Electric Company, Chicago, Ill.

[21] Appl. No.: 506,944

[22] Filed: Jun. 22, 1983

[51] Int. Cl.$^4$ ............................................. H02H 3/08
[52] U.S. Cl. ......................................... 361/93; 361/98
[58] Field of Search ....................... 361/18, 93, 98, 86, 361/88, 100, 102; 323/243, 242

[56] References Cited

U.S. PATENT DOCUMENTS

| | | | |
|---|---|---|---|
| 2,977,510 | 3/1961 | Adamson et al. | 317/36 |
| 3,064,163 | 11/1962 | Smith | 317/60 |
| 3,114,079 | 12/1963 | Sofianek et al. | 317/22 |
| 3,125,715 | 3/1964 | Brooks | 361/18 |
| 3,213,321 | 10/1965 | Dalziel | 317/18 |
| 3,312,867 | 4/1967 | Sonnemann | 317/36 |
| 3,312,875 | 4/1967 | Mayer | 317/147 |
| 3,339,114 | 8/1967 | Kelley et al. | 317/36 |
| 3,717,796 | 2/1973 | Simpson et al. | 317/148.5 R |
| 3,831,061 | 8/1974 | Boyd | 317/36 TD |
| 4,225,777 | 9/1980 | Schindler | 323/243 |
| 4,380,785 | 4/1983 | Demeyer et al. | 361/96 |
| 4,393,431 | 7/1983 | Gilker | 361/97 |
| 4,442,472 | 4/1984 | Pang | 361/96 |

OTHER PUBLICATIONS

Berkebile, "Digital EHV Current Transducer", 1980, 7 pages.
Keders et al., "A Current-Limiting Device for Service Voltages Up to 34.5 kV", Jul. 18, 1976, 7 pages, IEEE PES Summer Meeting Paper No. A76 436-6.
Calor Emag Company, "Fault Levels Too High?", Leaflet No. 1197/6E, 2 pages, Date Unknown.

Primary Examiner—Harry E. Moose, Jr.
Attorney, Agent, or Firm—James V. Lapacek

[57] ABSTRACT

A power supply is provided for energizing a trip signal generator and for selectively operating a device in response to the detection by the trip signal generator of overcurrent in a alternating current line. The power supply receives input of full-wave rectified current that is directly proportional to the alternating current in the line. A regulator circuit is also provided to power the trip signal generator and other circuitry. When current initially flows in the line the regulator rapidly produces an output voltage approximately equal to the input voltage up to a first voltage level. When the input voltage exceeds that level, the output voltage of the regulator increases at a slower rate than the input voltage to permit regulation of the output voltage. When energized, the output voltage is regulated at a predetermined constant level. The power supply also includes an energy storage circuit for supplying the input voltage to the regulator and to a circuit interrupter when desired. A control portion in conjunction with a switch portion alternately shunts current away from or permits current to flow to the energy storage portion and regulator portion to maintain the voltage across the energy storage portion within a predetermined range. The predetermined voltage range of the energy storage circuit is shifted higher upon receipt of a signal from the trip signal generator to increase the amount of energy stored in the energy storage circuit for interrupting the circuit in the line.

19 Claims, 1 Drawing Figure

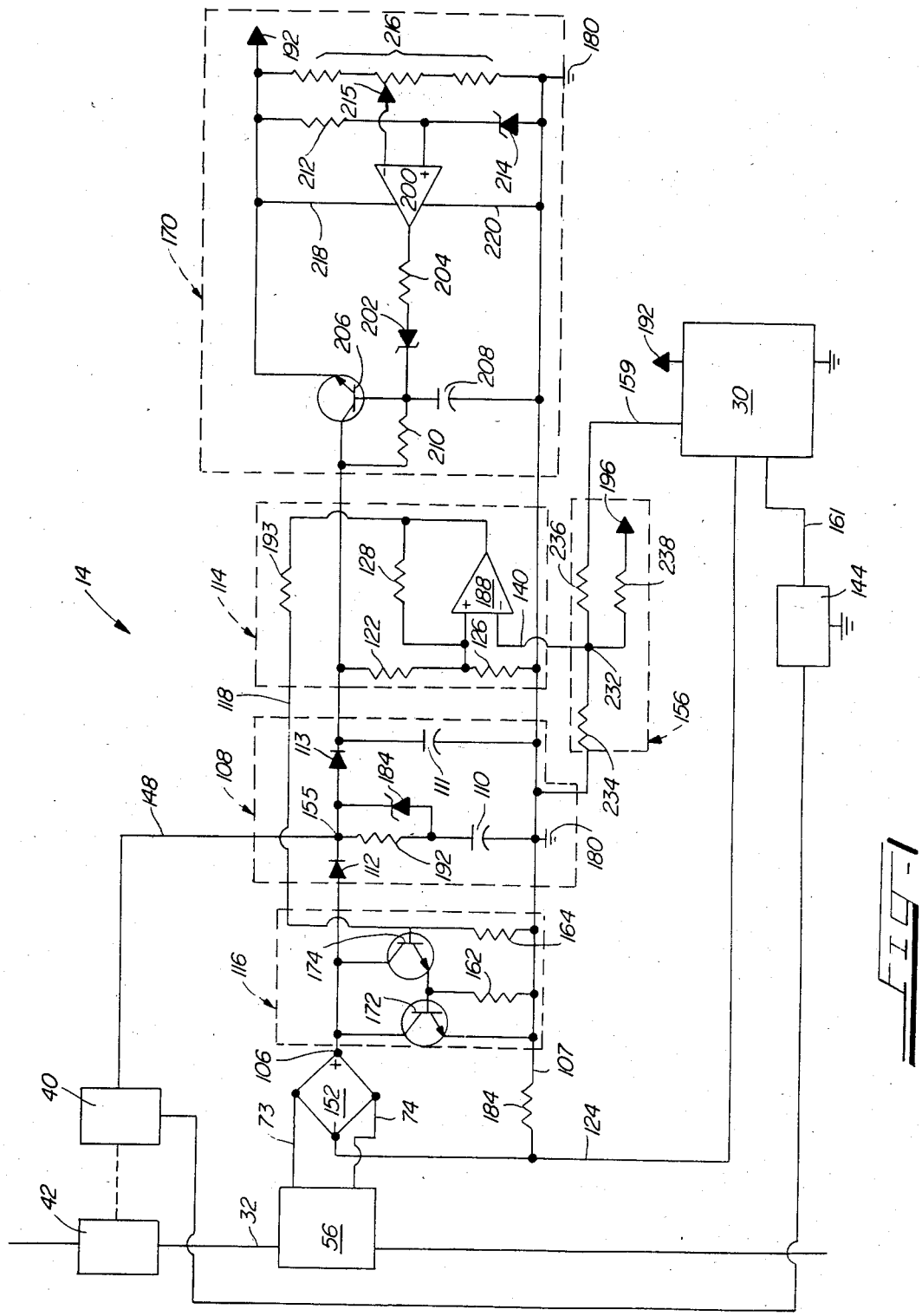

POWER SUPPLY FOR A CIRCUIT INTERRUPTER

BACKGROUND OF THE INVENTION

1. Field of the Invention

The present invention relates to a power supply for energizing a trip signal generator and for initiating the operation of a circuit interrupter in response to a signal from the trip signal generator, and more specifically, to a power supply that rapidly and stably energizes the trip signal generator to a power level sufficient to permit stable operation thereof, and in one mode of operation, applies stored energy to a circuit interrupter in response to a signal from the trip signal generator.

2. Description of the Prior Art

Although power supplies for operating circuit interrupters are known in the art, none efficiently accomplishes the objects of the present invention.

Rapid and stable energizing is especially important when, upon closing an energized line incorporating the circuit interrupter, an overcurrent is present. As used herein, "overcurrent" means any alternating current in the line in excess of a selected threshold. Under this condition the power supply must stably energize almost instantaneously because the trip signal generator must be capable of rapidly and accurately detecting and analyzing the overcurrent and generating a trip signal to cause the power supply to reliably operate the circuit interrupter in time to minimize damage to equipment connected to the line.

Therefore, it is an object of the present invention to rapidly and stably energize a trip signal generator. It is another object of the present invention to provide sufficient electrical energy to operate a circuit interrupter. It is a further object of the present invention to provide a power supply capable of operating an associated circuit interrupter when overcurrent is detected by the trip signal generator after a line containing the circuit interrupter is energized.

The operation of the power supply at a lower voltage range during steady-state or non-overcurrent conditions and at a higher voltage range only when it is necessary to operate an associated circuit interrupter or other device would improve the reliability of the power supply by reducing the electrical stress on the circuit components. It is another object of the present invention to provide a power supply that operates within a first voltage range during steady-state operation and within a second, higher voltage range when it is necessary to supply power to operate an associated circuit interrupter or other device.

It should be noted that the power supply of the present invention can be used to supply operating power to a variety of trip signal generators, circuit interrupters, circuit breakers, reclosers, circuit switchers, alarms, and the like. Thus, another object of the present invention is to provide a versatile power supply which may be used with many devices for the rapid and stable energization of sensors or detectors in the devices, and for the reliable storage of sufficient energy to operate the devices.

SUMMARY OF THE INVENTION

With the above and other objects in view, the present invention relates to a power supply for powering a trip signal generator circuit and for operating a circuit interrupter or other device. The trip signal generator circuit may be one which generates a trip signal to operate an interrupter device in response to the detection of overcurrent in an alternating current line being protected by such circuit interrupter.

The present invention may be used with many types of circuit interrupters, such as, for example, the type described in U.S. Pat. No. 4,359,708-Jarosz and Panas and U.S. Pat. No. 4,370,531-Tobin, both of which are commonly assigned to S&C Electric Company, the assignee of the present application. The present invention may be used in conjunction with the trip signal generator described in the copending U.S. patent application Ser. No. 506,942, entitled "Trip Signal Generator for a Circuit Interrupter," which is a continuation-in-part of application Ser. No. 506,943, and in conjunction with the control circuit described in U.S. patent application Ser. No. 658,239, entitled "Control Circuit for a Circuit Interrupter," both of which also are commonly assigned to S&C Electric Company.

In broad terms, the power supply of the present invention includes a source of full-wave rectified current related to the alternating current ("ac") in the line being protected, an energy storage circuit, a control circuit, a switch circuit, and a regulator circuit. Associated with the power supply, but not included in the present invention, is trip signal generator circuitry. The full-wave rectified current can be provided by a current transformer, which produces a current output directly proportional to the current in the line being protected, and a full-wave bridge rectifier connected to the output of the current transformer.

The energy storage circuit uses current received from the rectifier to store energy and serve as an energy source for the regulator circuit as well as for operating the associated circuit interrupter. The energy storage circuit includes two capacitors, one having a higher capacitance than the other. The small capacitor is used because it can be charged quickly so as to promptly supply voltage to the regulator circuit when the line being protected is initially energized. The voltage on the large capacitor increases at a slower rate than the voltage on the small capacitor but it stores more energy per volt than the small capacitor. The energy stored in the large capacitor is selectively used to operate the circuit interrupter.

The regulator includes a transistor and an operational amplifier that functions as an error amplifier to control the bias on the base of the transistor. The collector of the transistor is connected to the small capacitor of the energy storage circuit, which is charged by the output of the rectifier, and the emitter of the transistor is connected to the output terminal of the regulator. Forward base bias for the transistor is provided by a resistor connected between the base and collector. The base of the transistor is also connected, via a Zener diode, to the output of the operational amplifier. Until the difference between the voltage on the base of the transistor and the output voltage of the operational amplifier exceeds the reverse breakdown voltage of the Zener diode, the Zener diode isolates the output of the operational amplifier from the base of the transistor, thereby increasing conduction through the transistor and raising the voltage on the emitter (i.e., on the regulator output terminal). After the Zener diode breaks down, the amount of reverse conduction through the Zener diode is controlled by the output voltage of the error amplifier. A constant reference voltage is applied to the non-inverting input of the error amplifier and a selected fraction of the regulator output voltage is applied to the inverting input of the error amplifier. Accordingly, a decrease in current being drawn from the regulator output, which tends to increase the regulator output voltage, causes the output voltage of the error amplifier to decrease, thereby lowering the bias applied to the base of the transistor. This lowers the current supplied to the regulator output. An increase in current being drawn from the regulator output, which tends to decrease the regulator output voltage, increases the output voltage of the error amplifier, thereby increasing the base bias of the transistor. This raises the current being supplied to the regulator output.

The control circuit portion of the power supply of the present invention uses an operational amplifier as a Schmitt trigger to regulate the voltage across the small capacitor to within a predetermined range. The voltage levels within the range are determined by the reference voltage being applied to the inverting input of the operational amplifier. The output of the operational amplifier controls a switch circuit that is connected across the output of the rectifier. The switch circuit diverts the current being supplied by the rectifier away from the power supply when the voltage across the small capacitor, and hence the voltage applied to the regulator circuit, is within the predetermined range. When the voltage drops below the predetermined range, the control circuit causes the switch circuit to open so that the current from the rectifier is supplied to the capacitor.

Under steady state or non-overcurrent operating conditions the voltage across the small capacitor of the energy storage circuit is maintained within a first predetermined range. In response to a trip signal, the control circuit raises the reference voltage applied to the inverting input of the operational amplifier, thereby causing the voltage on the small capacitor to increase to a second predetermined range that is higher than the first range. The voltage on the large capacitor is thereby also increased so that a greater amount of energy is available to operate the circuit interrupter or other device.

Because receipt of a trip signal causes the control circuit to immediately raise the voltage on the capacitors, the control circuit immediately opens the switch circuit. This ensures that the current from the bridge rectifier is available to the power supply, either to the capacitors for charging to the higher voltage range or, under certain conditions, to the circuit interrupter without delay.

BRIEF DESCRIPTION OF THE DRAWING

FIG. 1 is a schematic diagram of one embodiment of the power supply of the present invention along with certain elements of a circuit interrupter device with which the power supply may be used.

DETAILED DESCRIPTION OF THE INVENTION

As illustrated in FIG. 1, the preferred embodiment of power supply 14 of the present invention includes a current transformer 56, a full-wave bridge rectifier 152, a switch circuit 116, an energy storage circuit 108, a control circuit 114, a regulator 170, and a resistor network 156. As described in more detail below, the power supply 14 of the present invention serves two purposes. First, it provides a rapid and stable energy supply for a trip signal generator 30. Second, upon receipt of a trip signal from the trip signal generator 30 indicating an overcurrent in an alternating current line 32, the power supply 14 provides sufficient energy to operate an associated interrupter operator 40 of a circuit interrupter 42 to open the line 32.

The current transformer 56 is associated with the line 32, which includes the related equipment being protected by the circuit interrupter 42. The output of the current transformer 56 is connected via leads 73 and 74 to the input terminals of a full-wave bridge rectifier 152. The rectifier 152 produces a full-wave rectified current output signal that is proportional to the current in the line 32. As one skilled in the art would recognize, a suitable sensor and transducer other than the current transformer 56 and rectifier 152 could be used with the present invention to provide an output signal proportional to the current in the line 32. The positive output of the rectifier 152 is applied to the power supply 14 via a conductor 106. The negative output of the bridge rectifier 152 is connected to the power supply 14 via a resistor 154 and a conductor 107, which is connected as shown to the circuit common 180. Under steady-state or non-overcurrent operating conditions of power supply 14, the current in the line 32 alternates, and the current supplied from the conductor 106 represents current in the line 32 that is below the threshold.

As seen in FIG. 1, the negative output of the rectifier 152 may be connected to the trip signal generator 30 via a conductor 124. The operation of one type of trip signal generator 30 is described in the above-referenced, co-pending U.S. patent application Ser. No. 658,239, entitled "Trip Signal Generator for a Circuit Interrupter" and Ser. No. 506,942, entitled "Control Circuit for a Circuit Interrupter." The trip signal generators 30 analyzes the signal on the conductor 124. When the trip signal generator 30 detects overcurrent in line 32, it transmits a trip signal to the power supply 14 via conductor 159. The former copending application dicloses that part of trip signal generator 30 which provides a time delay prior to closing a switch 144 via conductor 161 in response to certain overcurrents (e.g., moderate overcurrents), while another part of trip signal generator 30 described in the latter copending application closes switch 144 in response to other overcurrents (e.g., high overcurrents) at the same time that it transmits a trip signal to power supply 14. As described below upon receipt of a trip signal by the switch 144, the switch 144 closes, thereby completing a circuit between the power supply 14 and circuit common, via the interrupter operator 40 and the switch 144. The switch 144 may comprise, for example, a silicon controlled rectifier, transistor, or other such device. The power supply 14 thereupon diverts energy from the energy storage circuit 108 and from the output conductor 106 to energize the interrupter operator 40 and cause the associated circuit interrupter to interrupt the overcurrent in line 32.

Energy Storage Circuit 108

In the preferred embodiment, the energy storage circuit 108 includes two capacitors 110 and 111 and two diodes 112 and 113. The capacitance of capacitor 111 is preferably smaller than the capacitance of capacitor 110. The energy stored in capacitor 110 is used, along with the current in the conductor 106 to power the interrupter. Capacitor 111 stores energy to operate the power supply 14, which in turn supplies energy to the trip signal generator 30.

One side of the capacitor 110 is connected to circuit common 180 and the other side of the capacitor 110 is connected to the positive output conductor 106 of the bridge rectifier 152 through a parallel combination of a resistor 182 and a Zener diode 184 to a node 155 between a diode 113 and a diode 112. The capacitor 111 is connected between circuit common and the output 106 of the rectifier 152 via the series combination of diodes 112 and 113. Diodes 112 and 113 are connected so as to be forward-biased by positive signals on the output conductor 106. Therefore, the diodes 112 and 113 prevent the capacitors 110 and 111 from discharging through the switch circuit 116. In an alternative embodiment discussed hereinafter, the diode 113 is omitted. The Zener diode 184 is connected so as to conduct in the forward direction from capacitor 110 to the node 155. The node 155 is connected by lead 148 to the interrupter operator 40. The function of the resistor 182 and Zener diode 184 is described hereinafter.

The capacitor 110 is sufficiently large to store enough energy to operate reliably the interrupter operator 40. Capacitor 111 should be small enough to quickly reach a voltage sufficient to rapidly energize the regulator 170, control circuit 114, and trip signal generator 30. Rapid energizing is important so that the power supply 14 can quickly supply power to the trip signal generator 30 thereby enabling the trip signal generator 30 to promptly generate a trip signal when there is an overcurrent in the line 32 at the time the power supply 14 is initially energized.

The use of the two capacitors 110 and 111 and the low capacitance of capacitor 111 relative to capacitor 110 ensure that the trip signal generator 30 and regulator 170 are rapidly and stably energized. The large capacitor 110, which requires more time to charge, is chosen to ensure that it stores sufficient energy to operate reliably the interrupter operator in response to overcurrent, regardless of the current available from the output conductor 106 of the bridge rectifier 152. Thus, if a single capacitor is used that is capable of storing sufficient energy to operate the interrupter operator, rapid energization of trip signal generator 30 and regulator 170 could not be easily achieved, and vice versa.

Regulator 170

The regulator 170 of the power supply 14 maintains a regulated voltage on an output terminal 192. The output voltage on the terminal 192 may be used to energize the various components of the power supply 14 (for example, operational amplifier 188) and the trip signal generator 30.

The regulator 170 includes a transistor 206, which functions as a voltage regulator, and an operational amplifier 200, which functions as an error amplifier to control the current in the base of the transistor 206. The collector of the transistor 206 is connected to the positive side of the capacitor 111 and, via the diode 113 and resistor 182, to the capacitor 110 of the energy storage circuit 114, which is charged by current from the positive conductor 106 of the rectifier 152. The emitter of the transistor 206 is connected to the output terminal 192. The voltage established by a resistor 210 connected between the base and collector of the transistor 206 biases the transistor 206 "on". The base of the transistor 206 is also connected, via a Zener diode 202 in series with a resistor 204 to the output of the operational amplifier 200. Power leads 220 and 218 supply power to operational amplifier 200. It should be understood that power leads analogous to leads 218 and 220 for the operational amplifier 200 are also provided for other active components, although they are not illustrated in the drawing. A capacitor 208, connected from the base of the transistor 206 to circuit common, operates as a filter for the base bias voltage due to the oscillation of the voltages across the capacitors 110 and 111.

When the difference between the voltage on the base of the transistor 206 and the output voltage of the operational amplifier 200 exceeds the reverse breakdown voltage of the Zener diode 202, the Zener diode 202 conducts current away from the base of the transistor 206 through the operational amplifier 200, thereby lowering the base bias voltage applied to transistor 206. The lower base bias voltage decreases the conduction of the transistor 206, which prevents the voltage on the emitter from increasing (i.e., on the output terminal 192 of the regulator 170). The amount of reverse conduction through the Zener diode is controlled by the output voltage of the operational amplifier 200. Shortly before the voltage at the output terminal 192 reaches the desired value, a constant reference voltage equal to the reverse breakdown voltage of a Zener diode 214 is applied to the non-inverting input of the operational amplifier 200. The Zener diode 214 is connected from the non-inverting input of the operational amplifier 200 to circuit common. The non-inverting input of the operational amplifier 200 is also connected to the emitter of transistor 206 via a resistor 212. A selected fraction of the voltage on the output terminal 192 of the regulator 170 is applied to the inverting input of the operational amplifier 200 by a connection to a variable tap 215 on a resistance network 216, which is connected between the output terminal 192 and circuit common.

Accordingly, during steady-state or non-overcurrent operation when the base bias voltage applied to the transistor 206 exceeds the reverse breakdown voltage of the Zener diode 202, a tendency for the output voltage at the output terminal 192 to increase causes the output voltage of the operational amplifier 200 to decrease, thereby lowering the bias voltage applied to the base of the regulator transistor 206 by draining more base current to circuit common via the Zener diode 202, the resistor 204 and lead 220. A tendency for the voltage at output terminal 192 to decrease causes the output voltage of the operational amplifier 200 to increase, thereby raising the bias voltage applied to the base of the regulator transistor 206. Accordingly, the output voltage is regulated at the desired value.

Control Circuit 114

The control circuit 114 includes an operational amplifier 188 used as a comparator that operates as a Schmitt trigger because of the feedback resistor 128 (i.e., it produces an output when the non-inverting input exceeds a specified turn-on level, the output continuing until the input falls below a specified turn-off level). A resistor 126 is connected from the non-inverting input of the operational amplifier 188 to ciruit common. Another resistor 122 is connected from the non-inverting input of the operational amplifier 188 to the positive side of capacitor 111. Thus, the resistors 122 and 126 form a voltage divider which applies a voltage to the non-inverting input of the operational amplifier 188 that is some fraction of the voltage across capacitor 111.

Resistor Network 156

The inverting input 140 of the operational amplifier 188 is connected by path 140 to resistor network 156, which is comprised of resistors 234, 236 and 238. Resistor 238 is connected from the inverting input to a fixed reference voltage 196 (which can be obtained, for example, from the voltage on the output terminal 192); a resistor 236 is connected between the non-inverting input 140 of operational amplifier 188 and output 159 of trip signal generator 30. The resistor 234 is connected between the non-inverting input of the operational amplifier 188 and circuit common. When no trip signal is generated by the trip signal generator 30, the resistor 236 is effectively connected to circuit common, and the reference voltage applied to the inverting input of the operational amplifier 188 (hereinafter "$V_{RN}$") is determined solely by the voltage divider formed by the resistor 238 and the parallel combination of the resistors 234 and 236 with respect to the voltage source 196. When a trip signal (i.e., consisting of a positive voltage) is applied by the trip signal generator 30, the reference voltate (hereinafter "$V_{RT}$") applied to the inverting input 140 is higher than $V_{RN}$.

Switch Circuit 116

The switch circuit 116 may be a Darlington circuit or equivalent shunt switch which does not conduct or is off when the output 189 of the operational amplifier 188 is low and conducts or is on when the output 189 is high.

The output 189 of the operational amplifier 188 is connected through a resistor 193 to the base of a transistor 174 of the switch circuit 116. In the preferred embodiment, the switch circuit 116 includes transistors 172 and 174 connected in a Darlington configuration.

When the output 189 of the operational amplifier 188 is low, transistor 174 is off. Accordingly the transistor 172 also will be off. Thus, the switch circuit 116 is off and current in conductor 106 is applied to the energy storage circuit 108. When the output of the operational amplifier 188 goes high, transistor 174 is turned on, transistor 172 is turned on, the switch circuit 116 is on and current in the conductor 106 cannot reach the energy storage circuit 108.

Initial Power-Up of Power Supply 14

When the circuit containing the line 32 is initially energized, the resistor 182 effectively isolates capacitor 110 from the conductor 106 of the rectifier 152 while the voltage on capacitor 111 rises rapidly from 0 volts as it is charged by the current from the conductor 106. The voltage on the small capacitor 111 increases more rapidly than would the voltage on the large capacitor 110 used alone, and more rapidly than it would on the parallel combination of the capacitors 110 and 111 if the resistor 182 was omitted. As explained more fully below, when the capacitor 111 has been charged to about $V_e$, which occurs rapdily, the regulator 170 is able to stably energize the control circuit 114 and trip signal generator 30. The voltage on capacitor 111 continues to increase until it reaches a high, steady-state (i.e., when the trip signal generator 30 is not producing a trip signal) value ($V_2$). A voltage level of $V_2$ across the capacitor 111 causes the voltage applied to the non-inverting input of the operational amplifier 188 to exceed the voltage $V_{RN}$ being applied to the inverting input. This causes the output of the operational amplifier to go high, which turns the switch circuit 116 on and shunts the current from conductor 106 to circuit common via conductor 107, preventing further charging of the capacitor 111 and eliminating further flux build-up in the current transformer 56. The voltage $V_2$ on the capacitor 111 energizes the regulator 170, which in turn energizes the trip signal generator 30 and operational amplifier 188 as well as other portions of the circuitry. Such energization causes the voltage on the capacitor 111 to decrease to a lower, steady-state value ($V_1$), at which time the output of control circuit 114 goes low, which turns switch circuit 116 off. Turning switch circuit 116 off causes current to be supplied from output 106 to recharge capacitor 111 to $V_2$, at which time control circuit 114 again turn switch circuit 116 on. During steady-state conditions, this cycle then repeats, causing the voltage across the capacitors 110 and 111 to oscillate or regulate between $V_1$ and $V_2$. Diode 113 permits charging of capacitor 111 while preventing it from discharging via the node 155 or the switch circuit 116. Diode 112 permits charging of capacitor 110 while preventing it from discharging through the switch 116 when the switch is on. In an alternative embodiment the diode 113 is omitted, as discussed below.

As the voltage on capacitor 111 initially rises from 0 volts, so does the voltage on the capacitor 110, albeit at a slower rate due to its higher capacitance and the isolating action of resistor 182. Thus, when the voltage on capacitor 111 first reaches $V_e$ (at which point the regulator 170 is operational) and then $V_2$ (at which point the switch circuit 116 is first closed), the voltage on the large capacitor 110 is lower than that on the small capacitor 111. When the voltage across capacitor 111 has decreased to $V_1$, the control circuit 114 turns switch 116 off to recharge the capacitor 111 to $V_2$, and the voltage on capacitor 110 increases toward $V_2$. Since the capacitor 110 is larger than the capacitor 111 and in series with the resistor 182, it also discharges at a slower rate than the capacitor 111. Therefore, after several cycles of operation of control circuit 114, the voltage on capacitor 110 asymptotically approaches the voltage on capacitor 111 in stepwise fashion, the voltages differing only by the voltage drop across resistor 182 and diode 113. Thereafter, the two voltages oscillate and nearly follow each other between $V_1$ and $V_2$.

When the power supply 14 of the present invention is initially energized, the transistor 206 is initially off and the operational amplifier 200 is initially de-energized because there is no voltage applied between power leads 218 and 220 thereof. Accordingly, when the voltage on capacitor 111 first begins to increase from 0 volts, there is no voltage present on regulator output terminal 192 or on the various portions of the power supply 14.

As the voltage on the capacitor 111 increases, the voltage at the base of the transistor 206 increases due to the resistor 210. When this voltage difference is sufficiently large, but well below $V_e$, the transistor 206 conducts and the current conducted therethrough is applied by the emitter of the transistor 206 to the power lead 218 of the operational amplifier 200 and to the main voltage output 192. Without the Zener diode 202, the voltage at the regulator output terminal 192 would increase, but at a slower rate than the rate at which the voltage on capacitor 111 increases. The Zener diode 202 initially prevents current in resistor 210, from flowing to circuit common via the resistor 204 and the power lead 220 of the operational amplifier 200. Accordingly, all current in the resistor 210 due to the increasing voltage on capacitor 111 initially (before $V_e$ is reached) flows to the base of transistor 206 to increase the conduction thereof. Consequently, initially as the voltage on capacitor 111 increases at a fast rate, the voltage at main voltage output 192 increases at substantially the same fast rate. Thus, Zener diode 202 ensures that the rapid buildup of voltage on capacitor 111 is initially duplicated by a similar rapid voltage buildup at the regulator output terminal 192 to ensure that the various portions of circuit 14 and trip signal generator 30 and the operational amplifier 188 are energized and stabilized as rapidly as possible.

As mentioned above, as the voltage on the capacitor 111 increases, the current in the base of the transistor 206 also increases so that the conductivity of transistor 206 continues to increase. When the voltage across power leads 218 and 220 of operational amplifier 200 reaches a voltage substantially less than $V_e$, the operational amplifier 200 is fully energized and stable. Appropriate selection of resistor 212, Zener diode 214, and voltage-divider network 216 results in the non-inverting input of operational amplifier 200 having a higher signal thereon than the inverting input when operational amplifier 200 is initially stably energized. Accordingly, the output of the operational amplifier 200 is high, which prevents the Zener diode 202 from conducting so all of the increasing current through resistor 210 flows to the base of the transistor 206 increasing the conduction thereof. As the voltage at the regulator output terminal 192 increases toward $V_e$, the Zener diode 214 conducts in a reverse direction, clamping the non-inverting input of the operational amplifier 200 at a selected voltage. When Zener diode 214 first reversely conducts, the voltage applied to the inverting input of operational amplifier 200 by network 216 remains below the voltage on the non-inverting input. Accordingly, the output voltage of operational amplifier 200 remains high and continues to force current in resistor 210 to flow to the base of transistor 206, further increasing its conduction and effecting a continued rapid increase of the voltage on main voltage output 192, which tracks the rapid voltage build-up on the capacitor 111.

Eventually, the voltage on the regulator output terminal 192 increased to $V_e$, at which time the voltage on the inverting input of operational amplifier 200 is equal to that on the non-inverting input. The output of operational amplifier 200 now decreases. Further, at about the same time the voltage across the Zener diode 202 is sufficient to cause reverse conduction thereof. As a consequence, with the output of operational amplifier 200 low and Zener diode 202 reversely conducting, some of the current in resistor 210 flows through Zener diode 202 and resistor 204 to circuit common through power lead 220 of the operational amplifier 200. This action produces $V_e$ on the main voltage output 192.

As the voltage on the capacitor 111 continues to increase toward $V_2$, the output of the operation amplifier 200 is forced even lower as the voltage on the inverting input tends to rise relative to the clamped voltage on the non-inverting input thereof. With a lower output, even more current flows away from the base of transistor 206 to circuit common, decreasing its conduction to hold the current in its emitter at a level whereby the constant voltage $V_e$ is maintained on the regulator output terminal 192.

As the voltage on the capacitors 110 and 111 oscillates between $V_1$ and $V_2$, as described above, the output of the operational amplifier 200 increases or decreases to maintain the constant voltage $V_e$ on the regulator output terminal 192. The capacitor 208 acts as a filter for the voltage oscillation or regulation between $V_1$ and $V_2$ on the capacitor 111. The output of operational amplifier 200 increases when the voltage on the capacitor 111 decreases, as occurs when trip signal generator 30 and other components consume power, forcing a greater portion of the current into the base of the transistor 206 via the resistor 210 to maintain the voltage at the regulator output terminal 192 constant at $V_e$. Also, the output of the operational amplifier 200 decreases as the voltage across the capacitors 110 and 111 and on the conductor 106 increases, as occurs when the switch circuit 116 is turned off, to permit more current in resistor 210 to flow to the circuit common 180, which decreases the current in the base of the transistor 206 and holds the voltage at the regulator output terminal 192 at $V_e$. Thus, whether voltage increases are due to the oscillation or regulation of the voltages across the capacitors 110 and 111 between $V_1$ and $V_2$, of are due to the voltage on the capacitors 110 and 111 being increased to between $V_3$ and $V_4$ (as discussed below), or are due to increases in the amount of current being drawn from the regulator output terminal 192 by other portions of the circuit 14, the regulator 170 continues to hold the voltage at the regulator output terminal 192 at $V_e$.

If there is overcurrent such that the current in the line 32 is rapidly increasing when the line 32 containing the interrupter device 42 associated with the power supply 14 is initially energized, the current flowing on the conductor 106 is correspondingly larger. This larger current charges capacitor 111 to $V_1$ and then to $V_2$ as described above, but even more rapidly. Because the larger current results in a larger voltage drop across resistor 182 than when the current in line 32 is normal, the Zener diode 184 conducts in a reverse direction. Reverse conduction of the Zener diode 184 effectively by passes the resistor 182 of the charging path of the capacitor 110, slowing the rate at which the capacitor 111 charges toward $V_2$ and increasing the rate at which the capacitor 110 charges toward $V_2$. Also, when the control circuit 114 opens the switch circuit 116 to permit capacitor 111 to recharge from $V_1$ to $V_2$, capacitor 110, the voltage of which held at less than $V_2$ while the switch circuit 116 was closed, experiences a voltage increase, albeit to less than $V_2$. This recharging of the capacitor 111 to $V_2$ is again accompanied by reverse conduction of the Zener diode 184 when the voltage on capacitor 111 is sufficiently less than $V_2$. Thus, with overcurrent in the line 32, increased current is provided to the power supply 14 from the conductor 106 of the bridge rectifier 152. As a result the regulator 170 is energized more rapidly and the voltages on capacitors 110 and 111 approaches $V_2$ more rapidly than when the current in the line 32 is lower. CL Steady-State Operation of Power Supply 14

Control circuit 114 and switch circuit 116 normally maintain the voltage of capacitors 110 and 111 within a first range, between the first value $V_1$ and a second, higher value $V_2$. When the capacitor 111 is discharged to $V_1$, the control circuit 114 senses this condition and turns off the switch circuit 116 via lead 118, thereby causing current from the output conductor 106 of the rectifier 152 to charge the capacitors 110 and 111 to $V_2$. When the voltage on capacitor 111 reaches its steady-state low value $V_1$, the output of operation amplifier 188 is low, turning transistors 172 and 174 off, to turn off the switch circuit 116. As a consequence, the voltage on capacitors 110 and 111 is increased by current from conductor 106. When the voltage on capacitors 110 and 111 reaches $V_2$, the output of operational amplifier 188 goes high, turning transistors 172 and 174 on. This closes switch circuit 116 to effective shunt current from conductor 106 to circuit common. When capacitor 111 again reaches $V_1$, the output of the operational amplifier 188 again goes low, turning transistors 172 and 174 off and increasing the voltage of the capacitors to $V_2$.

This oscillation of the voltages on capacitors 110 and 111 within a first range between $V_1$ and $V_2$ follows the initial stable energization of the control circuit 114 and continues as long as the current in the line 32 is below the threshold level. As described more fully below, the presence of overcurrent in the line 32 causes the trip signal 30 to send a trip signal via line 159, which causes the control circuit 114 to open the switch circuit 116. If the switch 144 is not yet rendered conducting by a trip signal from the trip signal generator 30, the capacitors 110 and 111 are charged to a voltage within a second higher range (between $V_3$ and $V_4$). After the capacitor 110 reaches the same voltage as the capacitor 111, the two capacitors 110 and 111 oscillate and follow one another between $V_3$ and $V_4$. When the switch 144 is closed, the current from the output conductor 106 and the capacitor 110 flows to the interrupter operator 40 via lead 148 and node 155. When the switch 144 is rendered conducting by a trip signal from the trip signal generator 30 via line 161, therefore, circuit interrupter 42 is operated to interrupt the current in the line 32. As noted above, the two voltage ranges ($V_1$ to $V_2$ and $V_3$ to $V_4$) for the capacitors 110 and 111 are set by the application of the two reference voltages $V_{RN}$ and $V_{RT}$ from the resistor network 156 to the inverting input 140 of the operational amplifier 188.

With a low signal present on input line 159, which occurs whenever the current in the line 32 is below the threshold level, the lower reference voltage $V_{RN}$ causes the operational amplifier 188 to maintain the voltage on the capacitors 110 and 111 between $V_1$ and $V_2$. When a high signal is present on the input line 159, which occurs when the trip signal generator 30 generates a trip signal, the higher reference voltage $V_{RT}$ causes the operational amplifier 188 to maintain the voltage on capacitors 110 and 111 between $V_3$ and $V_4$ until the switch 144 conducts, thereby permitting energy stored in the capacitor 110 and current in the conductor 106 to flow from the node 155 via lead 148 to operate the interrupter operator 40.

Operation of Circuit Interrupter 42

When an overcurrent is detected in line 32 by the trip signal generator 30, a trip signal is applied to the resistor network 156 of the power supply 14 via line 159. When trip signal generator circuit 30 determines that the current in the line 32 is to be interrupted, a signal is applied via path 161, which renders the switch 144 conducting.

Connected in series with the switch 144, which is normally not conducting, is the interrupter operator 40. When switch 144 conducts, a path through the interrupter operator 40 is completed through the lead 148. This permits current from the charged stored in energy storage circuit 108 and the current being supplied from the output conductor 106 to flow through the interrupter operator 40 to circuit common. The interrupter operator 40 initiates the operation of circuit interrupter 42 as illustrated by the dashed line in FIG. 1. The interrupter operator 40 may be, for example, a power cartridge containing an incendiary material that is ignited by current flowing from the power supply 14 via path 148.

However, the steady-state energy normally stored in the energy storage circuit 108 when operating in the voltage range of between $V_1$ and $V_2$ is insufficient to operate the interrupter operator 40. The current being supplied from the output conductor 106 derived from certain overcurrents in the line 32 may also be insufficient to achieve that end. Thus, increasing the energy stored in the energy storage circuit 108 by charging the capacitor 110 to at least $V_3$ ensures proper operation of the interrupter operator 40 when the current on the output conductor 106 is insufficient to operate the interrupter operator 40.

Note that when switch 144 conducts, both the energy stored in the capacitor 110 and the current in output conductor 106 of rectifier 152 are supplied to the interrupter operator 40 via the path 148. The current on the output conductor 106 may, for certain overcurrents, be sufficient to operate reliably the interrupter operator 40 without the necessity of charging the capacitor 110 to the second range ($V_3$ to $V_4$). Conversely, when the overcurrent in the line 32 results in an output current from the rectifier 152 on output conductor 106 that is insufficient to operate reliably the interrupter operator 40, it becomes necessary to delay closing the switch 144 for a time sufficient to charge the capacitor 110 to at least about $V_3$, which is higher than $V_2$. This is achieved, as described above, with the voltage on the capacitor 110 initially lagging, but ultimately approaching the voltage on capacitor 111 in stepwise fashion. After several cycles of operation of control circuit 114 and switch circuit 116, the voltages on the capacitors 110 and 111 are both $V_4$, thereafter oscillating between $V_4$ and the lower voltage, $V_3$.

Finally, regulator 170 continues to operate even after the interrupter operator 40 has been energized until the current in the line 32 has been effectively interrupted by the circuit interrupter 42. After operation, the path through the interrupter operator 40 may be open, requiring that regulator 170, control circuit 114, and switch circuit 116 continue to operate for the following reasons. Overcurrent was and, until the current on the line 32 is interrupted, still is present in the line 32, and the current on the output conductor 106 is quite high. If the regulator 170, control circuit 114, and switch circuit 116 were to cease operating at this point, the relatively high current on the output conductor 106 would be continuously applied to the energy storage circuit 108, the control circuit 114, and the regulator 170. This relatively high current is potentially harmful to these portions of the power supply 14, which is intended to be reusable, following replacement of the circuit interrupter 42. Accordingly, the continued operation of the regulator 170 and the control circuit 114 permits the power supply 14 to "wait" for the current in the line 32 to fall to zero. While the power supply 14 "waits," the control circuit 114 continues to open and close, the switch circuit 116 continues to maintain the voltage on the capacitors 110 and 111 within the range from $V_3$ to $V_4$, as described above, thus preventing higher voltages from developing. The transistors 172 and 174 of the switch circuit 116 are selected to be able to withstand, when the switch circuit 116 is closed, the high current from the output conductor 106. Thus, the continued operation of the control circuit 114 and the regulator 170 ensures that the power supply is not damaged by the relatively high current which appears on the output conductor 106 when there is overcurrent in the line 32.

It should be noted that the use of the control circuit 114 in conjunction with the switch circuit 116 permits the use of a smaller current transformer 56 than would otherwise be required for two reasons. First, due to the periodical opening and closing of the switch circuit 116 as described above, flux buildup in the current transformer 56 is minimized. Second, because voltages normally stored in the capacitor 110 in steady-state operating conditions (i.e., between $V_1$ and $V_2$) are insufficient to operate reliably the interrupter operator 40, the capacitor 110 is charged to voltages in a higher range (between $V_3$ and $V_4$), only on an "as needed" basis (i.e., only when the operation of circuit interrupter 42 is required). The use of a smaller current transformer is advantageous because it is saturated at a lower current level in the line 32 than a larger current transformer, thereby minimizing the potential for harm to the power supply 14 or the trip signal generator 30.

While the preferred embodiment of the present invention has been illustrated and described, it is to be understood that the invention is not limited to the precise construction herein disclosed, and the right is reserved to all changes and modifications coming within the scope of the invention as defined in the appended claims.

I claim:

1. A power supply for a circuit interrupter in an alternating current line, the circuit interrupter having a trip signal generator for generating a trip signal when the current in the line satisfies a predetermined condition, said power supply comprising:

current-producing means for producing output current proportional to the current in the line;

energy storage means for storing energy derived from said output current and for providing a source of energy to operate the circuit interrupter in response to generation of a trip signal by the trip signal generator;

reference signal means responsive to said trip signal for providing a reference signal, said reference signal being in a first state when no trip signal is generated and in a second state when a trip signal is generated;

control signal means responsive to said reference signal and to the amount of energy stored by said energy storage means for generating a control signal, wherein when said reference signal is in the first state, said control signal is in a first state when the amount of stored energy is less than a first predetermined level and in a second state when the amount of stored energy exceeds a second predetermined level, and wherein when said reference signal is in the second state, said control signal is in the first state when the amount of stored energy is less than a third predetermined level and in the second state when the amount of stored energy exceeds a fourth predetermined level; and switch means responsive to said control signal, said switch means being in the off state when said control signal is in the first state and in the on state when said control signal is in the second state, said switch means diverting said output current away from said energy storage means when in the on state and allowing output current to flow to said energy storage means when on the off state, thereby maintaining the energy stored in said energy storage means between said first and second predetermined levels when said reference signal is in the first state, and maintaining the energy stored in said energy storage means between said third and fourth predetermined levels when said reference signal is in the second state.

2. A power supply as claimed in claim 1 further comprising:

regulator means for providing a regulated output derived from said output current.

3. A power supply as claimed in claim 1 further comprising regulator means for providing a regulated output derived from energy stored in said energy storage means.

4. A power supply as claimed in claim 3 wherein said energy storage means further comprises:

first capacitance means for storing an electrical charge; and second capacitance means for storing an electrical charge, said second capacitance means having higher capacitance than said first capacitance means, wherein the control signal means responds to the energy stored in said first capacitance means.

5. The power supply as claimed in claim 4, wherein said energy storage means further comprises:

resistor means connected in series with said second capacitance means, and wherein said series combination of said resistor means and said second capacitor means is connected in parallel with said first capacitance means, whereby the rate of charge of said second capacitance means is lowered so that a greater portion of said output current initially charges said first capacitance means rather than second capacitance means, whereby the energy available to said regulator means increases rapidly when said output current initially increases from zero.

6. The power supply as claimed in claim 5 wherein the energy stored in said second capacitance means is applied to operate the circuit interrupter in response to the generation of a trip signal by the trip signal generator.

7. The power supply as claimed in claim 5 further comprising Zener diode means in parallel with said resistor means, said Zener diode means being connected so as to conduct reversely when said output current charging said second capacitance means is sufficiently large and to conduct forwardly when said second capacitance means discharges, whereby the rate of charging of said second capacitance means is higher when it initially begins to be charged by the sufficiently large output current while the discharge of said second capacitance means is not substantially affected by said resistor means.

8. A power supply as claimed in claim 1 wherein said current-producing means further comprises:

current transformer means; and rectifier means connected to the output of said current transformer means.

9. A power supply as claimed in claim 2, wherein said regulator means further comprises:

resistor means;

transistor means for regulating the flow of current from said energy storage means, said transistor means having a collector connected to said energy storage means, a base connected to its collector through said resistor means and an emitter, the emitter of said transmitter means serving as the regulated output of said regulator means;

error amplifier means having first and second input terminals and an output terminal for providing an output voltage on the output terminal proportional to the difference between the voltages applied to the first and second input terminals;

Zener diode means connected between the output terminal of said error amplifier means and the base of said transistor means for conducting current only in the direction that will increase the forward bias on the base of said transistor means except when the voltage on the base exceeds the output voltage of said error amplifier means by a predetermined amount;

constant error reference means for applying a constant error reference voltage to the first input terminal of said error amplifier means; and variable error reference means for producing a variable error reference voltage equal to a selected fraction of the voltage on the regulated output, said variable error reference voltage being applied to the second input of said error amplifer means, whereby when the difference between said constant error reference voltage and said variable error reference voltage is greater than a first level said error amplifier increases the output voltage of said error amplifier means and when the difference between said constant error reference voltage and said variable error reference voltage is less than a second level said error amplifier decreases the output voltage of said error amplifier means.

10. A power supply as claimed in claim 1 wherein said switch means further comprises:

transistor means connected across the output of said current-producing means in a Darlington configuration.

11. A power supply as claimed in claim 4 wherein said second capacitance means further comprises diode means for preventing said second capacitance means from discharging through said switch means when said switch means is in the on state.

12. A power supply as claimed in claim 1 further comprising:

gate means responsive to said trip signal for diverting energy stored in said energy storage means to operate the circuit interrupter.

13. A power supply for a circuit interrupter in an alternating current line, the circuit interrupter having a trip signal generator for generating a trip signal when the current in the line satisfies a predetermined condition, said power supply comprising:

current-producing means for producing an output current proportional to the current in the line;

energy storage means for storing energy derived from said output current and for providing a source of energy;

control means for generating a control signal responsive to the amount of energy stored by said energy storage means, wherein said control signal is in a first state when the amount of stored energy is less than a first predetermined level and in a second state when the amount of stored energy exceeds a second predetermined level;

switch means responsive to said control signal, said switch means being in the off state when said control signal is in the first state and in the on state when said control signal is in the second state, said switch means diverting said output current away from said energy storage means when in the on state and allowing output current to flow to said energy storage means when in the off state; and gate means responsive to said trip signal for diverting said output current away from said energy storage means to operate the circuit interrupter when said trip signal is being generated, said gate means also diverting energy stored in said energy storage means to operate the circuit interrupter when said trip signal is being generated.

14. A power supply as claimed in claim 13 further comprising:

regulator means for providing a regulated output derived from said output current.

15. A power supply as claimed in claim 14 wherein said regulated output is also derived from energy received from said energy storage means.

16. A power supply for a circuit interrupter in an alternating current line, the power supply comprising:

current producing means for producing output current related to the current in the line;

energy storage means responsive to said output current for storing energy and for providing a source of energy; and control means responsive to a reference signal input and the amount of energy stored in said energy storage means for controlling the connection of said output current to said energy storage means, said control means being responsive to a first reference signal on said reference signal input for maintaining said stored energy in said energy storage means at a first predetermined level, said control means being responsive to a second reference signal on said reference signal input for maintaining said stored energy in said energy storage means at a second predetermined level, said energy storage means comprising a first capacitor for storing an electrical charge and a second capacitor for storing an electrical charge, the energy stored in said second capacitor being utilized for operation of the circuit interrupter independently of said control means, said energy stored in said first capacitor being utilized as a power supply output, said second capacitor being of substantially larger capacitance relative to said first capacitor, said first and second capacitors being interconnected by isolating means for isolating said first capacitor from said second capacitor to provide a fast-rise power supply output, said isolating means comprising a resistor, said isolating means also interconnecting said output current to said second capacitor.

17. The power supply of claim 16, wherein said control means comprises a control signal output, said control means further comprising switch means responsive to said control signal output for diverting said output current away from said energy storage means when said control signal output is in a first state and for selectively connecting said output current to said energy storage means when said control signal output is in a second state, said control means in response to said first reference signal providing said control signal output in said first state when said energy in said energy storage means is below said first predetermined level and providing said control signal output in said second state when said energy is above a third predetermined level, said control means in response to said second reference signal providing said control signal output in said first state when said energy in said energy storage means is below said second predetermined level and providing said control signal output in said second state when said energy is above a fourth predetermined level.

18. The power supply of claim 16 wherein said isolating means further comprises a zener diode being connected in parallel with said resistor, said zener diode having a cathode lead being connected toward said second capacitor.

19. A source of operating power for a circuit interrupter arrangement in an alternating current line to operate a trip signal generator that generates a trip signal under predetermined current conditions and to selectively operate an interrupter operator, the source of operating power comprising:
  current-producing means for producing output current proportional to the current in the line, said current-producing means having a predetermined limited output-capacity; and
  power supply circuitry means responsive to said output current for providing a fast response output to operate the trip signal generator, said power supply circuitry means comprising energy storage means for selectively operating the interrupter operator, said power supply circuitry means requiring limitation as to the level of input current, said power supply circuitry means comprising control means being responsive to an input signal of a first type for operating said energy storage means at a first level and being responsive to an input signal of a second type for operating said energy storage means at a second level higher than said first, the higher level of operation of said energy storage means compensating for the limited output-capacity of said current-producing means, said limited output-capacity of said current-producing means providing protection against levels of input current that are above the required limitation level of said power supply circuitry means.

* * * * *

UNITED STATES PATENT AND TRADEMARK OFFICE
CERTIFICATE OF CORRECTION

PATENT NO. : 4,567,540
DATED      : January 28, 1986
INVENTOR(S) : Joseph W. Ruta It is certified that error appears in the above—identified patent and that said Letters Patent is hereby corrected as shown below:

Col. 2, line 11, "506,942" should be -- 658,239 --
Col. 2, line 15, "658,239" should be -- 506,942 --
Col. 4, line 35, "dicloses" should be -- discloses --
Col. 4, line 44, after "below" add -- , --
Col. 7, line 53, "rapdily" should be -- rapidly --
Col. 10, lines 51 and 52, delete the symbol "CL" and move title to line 52
Col. 11, line 1, "effective" should be -- effectively --
Col. 11, line 59, "charged" should be -- charge --
Col. 13, line 65, "on" should be -- in --
Col. 14, line 30, "eaid" should be -- said --
Col. 14, line 66, "transmitter" should be -- transistor --

Signed and Sealed this

Sixth Day of October, 1987

Attest:

DONALD J. QUIGG

Attesting Officer

Commissioner of Patents and Trademarks